Patented Apr. 22, 1941

2,239,496

UNITED STATES PATENT OFFICE 2,239,496

TERPENE-CYANOACYL COMPOUND AND METHODS OF PRODUCING SAME

Joseph N. Borglin, Wilmington, Del., assignor to Hercules Powder Company, Wilmington, Del., a corporation of Delaware No Drawing. Application December 27, 1939, Serial No. 311,165

16 Claims. (Cl. 260—454)

This invention relates to a new series of terpene compounds and more particularly to a new series of terpene compounds having the type formula ROOCR'XCN in which R is a radical consisting of an ether of a polyhydric alcohol and a terpene compound, in which R' is an aliphatic or aromatic radical, and in which X is a member of the group consisting of sulfur, selenium, and tellurium. The invention also relates to a method for the production of these compounds.

By the method in accordance with this invention, I react a compound which is the ether of a terpene compound and a polyhydric alcohol with a halogenated organic acid and then with a metal thiocyanate, a metal selenocyanate, or a metal tellurocyanate, which is reacted under the conditions employed.

The terpene ether upon which I react with the halogenated acid may be an ether prepared by etherification of a terpene alcohol with a polyhydric alcohol or it may be an ether prepared by an addition reaction of a polyhydric alcohol with the unsaturated terpene compound. These ethers may be prepared, for example, as described in U. S. Patent 2,136,011, which issued November 8, 1938, to I. W. Humphrey, or in U. S. Patent 2,182,826 which issued December 12, 1939, to D. H. Sheffield. For example, the terpene ether may be an ether of ethylene glycol, trimethylene glycol, propylene glycol, diethylene glycol, butylene glycol, 2,3-pentanediol, 4,5-octanediol, sorbitol and other similar polyhydric alcohols obtained by the hydrogenation of sugars, hydrogenation products of formaldehyde condensation mixtures, pentaerythritol, glycerol chlorohydrin, glycerol monoacetate, glycerol monoethyl ether, etc., and such terpenes as, for example, pinene, dipentene, terpinene, terpinolene, camphene, carene, sabinene, etc., terpineol, borneol, isoborneol, fenchyl alcohol, etc., or crude terpene cuts such as wood or gum turpentine, pine oil, etc. Thus, for example, utilizing the ethers made from the reaction of pinene with ethylene glycol or with glycerine, thiocyanoacetates, thiocyanopropionates, etc., esters of radicals of such ethers will be produced. Specifically, the products made from these ethers of pinene will be predominantly the thiocyanoacyl esters of terpinyl glycol ether or terpinyl glycerol ethers, as the case may be, with quantities of other pinene derivatives in admixture. Similarly, the corresponding thiocyanoacyl esters (or their seleno or telluro counterparts) are obtained when ethers prepared from each of the polyhydric alcohols named are reacted with each of the terpenes named.

The halogenated organic acid which I use may be, such as, for example, monochloroacetic acid, dichloroacetic acid, trichloroacetic acid, alpha-chloropropionic acid, beta-chloropropionic acid, alpha-chlorobutyric acid, beta-chlorobutyric acid, gamma-chlorobutyric acid, a chlorovaleric acid, a chlorocaproic acid, chlorobenzoic acid, chlorostearic acid, chlorolauric acid, chloropalmitic acid, chloroleic acid, chlororicinoleic acid, chlorobehenic acid, chloromalonic acid, chlorophthalic acid, etc., and the corresponding bromine, fluorine, and iodine substituted acids.

The metal thiocyanate which I use may be any metal thiocyanate which is reactive under the conditions employed. To be reactive under the conditions employed, it must be partially or completely soluble in the reaction mixture utilized. Suitable metal thiocyanates, for example, are sodium thiocyanate, potassium thiocyanate, lithium thiocyanate, ammonium thiocyanate, calcium thiocyanate, etc. When it is desired to make the terpene selenocyanate, the metal selenocyanate I may use, may be, for example, sodium selenocyanate, potassium selenocyanate, lithium selenocyanate, ammonium selenocyanate, calcium selenocyanate, etc., and similarly, the metal tellurocyanate which I may use, may be, for example, sodium tellurocyanate, potassium tellurocyanate, lithium tellurocyanate, ammonium tellurocyanate, etc.

The reaction in accordance with this invention will desirably be carried out in two steps. The terpene ether will first be reacted with a halogenated acid and the resulting halogen acid ester of the terpene ether isolated from the by-products of the reaction. Preferably, excess acid is removed. The second stage of the reaction is the treatment of this halogen acid ester of the terpene with the metal thiocyanate, selenocyanate, or tellurocyanate, as the case may be. I may carry out each of these steps in the presence of a suitable inert solvent and in fact, I prefer to use an inert solvent such as methanol, ethanol, propanol, butanol, acetone, ethyl acetate, etc., in the second stage. Each step may be carried out at any temperature within the range of about 0° C. to about 250° C., and preferably within the range of about 50° C. to about 180° C.

The halogen substituted acylates of the first stage reaction are light in color if the reaction is carried out in the absence of oxygen, for example, under a blanket of $CO_2$. Substantially water-white esters may be obtained by vacuum distillation. The color of the thiocyanoacylate products follows the color of the first stage ester from which they are prepared. Where very light-colored products are desired and where it is desired to insure products of no odor or minimum odor, the first stage reaction may be conducted, if desired, in a non-oxidizing atmosphere, or the first stage product may be vacuum distilled, or both these measures may be taken.

In the reaction according to this invention, the halogenated acid may react at one or more reactive positions of the ether utilized according to the number of reactive positions available and the conditions of the reaction. It may react at a double bond, or at a position of latent unsaturation produced by bridge opening in a complex polycyclic terpene compound, or it may react with a hydroxyl group. Thus one or more molecules of the halogen acid may react with the ether utilized, and accordingly the thiocyano or sulfur content of the final product may vary. Where the ether employed contains more than one reactive position, the degree of esterification will vary with the relative proportions of the reactants and the time allowed for reaction. In referring to the thiocyanoacyl esters herein and in the claims, the esters mentioned include both mono and poly esters of the various ethers reacted upon.

The method in accordance with this invention will be further illustrated by the examples which follow:

Example 1

A mixture of 22.8 parts by weight of glycerol ethers of pinene and 18.9 parts by weight of chloroacetic acid was refluxed for 8 hours under a blanket of carbon dioxide in an oil bath maintained at a temperature of 170 to 175° C. The reaction mixture was then taken up in commercial hexane and the solution washed with water to remove the excess chloroacetic acid. After distilling off the solvent at reduced pressure, 26 parts by weight of the chloroacetic esters with a chlorine content of 7.6% were obtained.

24 parts by weight of this product were dissolved in 80 parts by weight of 95% ethyl alcohol and, after the addition of 18 parts by weight of potassium thiocyanate, the mixture was refluxed for one hour. About 100 parts of water and 80 parts by weight of benzene were then added. After a thorough shaking, the layers were separated, the benzene solution was washed with water repeatedly and the solvent removed by distillation at reduced pressure. 14.8 parts by weight of the thiocyanoesters with a sulfur content of 3.3% were thus obtained. This product consisted in large proportion of esters of terpinyl glycerol ethers.

Example 2

A mixture of 22.8 parts by weight of glycerol ethers of pinene and 18.9 parts by weight of chloroacetic acid was refluxed for 24 hours under a blanket of carbon dioxide in an oil bath maintained at 165 to 175° C. The chloroacetate formed was recovered in the same way as in the preceding example. A yield of 26.1 parts of product, containing 11.9% chlorine, was obtained.

24 parts of this product were converted to the corresponding thiocyano compound by refluxing with 40 parts by weight of 95% ethyl alcohol and 18 parts by weight of sodium thiocyanate. The resulting thiocyanoester was recovered in the same way as in the preceding example. A yield of 26.2 parts by weight was obtained and the product contained 6.2% sulfur.

Example 3

A mixture of 19.8 parts by weight of monoglycol ethers prepared from turpentine and 18.9 parts by weight of chloroacetic acid was refluxed for 8 hours under a blanket of carbon dioxide in an oil bath maintained at a temperature of 170 to 175° C. The reaction mixture was dissolved in 160 parts by weight of a mixture of benzene and commercial hexane in equal proportions, and the solution washed with water to remove the excess chloroacetic acid. After distilling off the solvent at reduced pressure, 29.8 parts by weight of the chloroacetic esters were obtained. This product contained 9.2% chlorine.

28 parts of the chloroacetates were refluxed with 80 parts by weight 95% ethyl alcohol and 19.0 parts by weight potassium thiocyanate for one hour. About 100 parts of water and 80 parts by weight of benzene were then added. After thorough shaking, the layers were separated, the benzene solution was washed with water and the solvent removed by distillation at reduced pressure. 19.2 parts of the thiocyanoacetates were obtained.

Example 4

A mixture of 19.8 parts by weight of monoglycol ethers prepared from turpentine and 18.9 parts by weight of chloroacetic acid was refluxed for 15 hours under a blanket of carbon dioxide in an oil bath maintained at a temperature from 170 to 203° C. The reaction mixture was then dissolved in 80 parts by weight of benzene and the solution washed with water. After removing the solvent by distillation at reduced pressure, 23.1 parts by weight of the chloroacetic esters were recovered.

21.5 parts by weight of this product was refluxed with 80 parts by weight of ethyl alcohol and 15 parts by weight of sodium thiocyanate for 30 minutes. The resulting thiocyanoesters were recovered in the same way as in Example 3. A yield of 19.1 parts by weight was obtained and the product contained 11.6% sulfur.

Example 5

A mixture of 19.8 parts by weight of ethylene glycol ethers of pinene and 18.9 parts by weight of chloracetic acid was refluxed for 8 hours under a blanket of carbon dioxide in an oil bath maintained at a temperature of 170 to 175° C. The reaction mixture was then dissolved in commercial hexane and the solution washed with water to remove the unreacted chloroacetic acid. After distilling off the solvent at reduced pressure, 17.8 parts by weight of the chloroacetic esters were obtained, with a chlorine content of 8.6%.

16 parts by weight of this product, 80 parts by weight of 95% ethyl alcohol and 12 parts by weight of potassium thiocyanate were refluxed for one hour. About 100 parts of water and 80 parts by weight of benzene were then added to the mixture. After thorough shaking the layers were separated, the benzene solution was washed with water repeatedly and the solvent removed by distillation at reduced pressure. 15.5 parts of thiocyanoesters, having a sulfur content of 5.1%, were thus obtained. The product obtained consisted essentially of esters of terpinyl glycol ethers.

Example 6

A mixture of 19.8 parts by weight of ethylene glycol ethers of dipentene and 21.7 parts by weight of alpha-chloropropionic acid was heated under a blanket of carbon dioxide for a period of about 40 hours during which the temperature of the oil bath was gradually raised from 100° C. to 145° C. The reaction mixture was then dissolved in benzene and the solution washed with water to remove the unreacted chloropropionic acid. After distilling off the solvent at a reduced pressure, 24.2 parts by weight of chloropropionic ester with 15% chlorine content were obtained.

22.7 parts by weight of this product were refluxed with 40 parts by weight of 95% ethyl alcohol and 18 parts by weight of sodium thiocyanate for one hour. 100 parts of water and 80 parts by weight of benzene were then added. After thorough shaking, the layers were separated, the benzene solution was washed with water repeatedly and the solvent removed by distillation at reduced pressure. The thiocyanopropionates thus obtained had a sulfur content of 14%.

The products of the examples contain unesterified terpene compounds and petroleum hydrocarbons in varying proportion. A certain portion of the original reactant is usually not esterified and, in addition, there may be some conversion of esters to terpene hydrocarbons in the second stage. The unesterified terpene compounds and petroleum hydrocarbons may be removed by vacuum distillation or vacuum steam distillation if desired. However, such removal is in general of no advantage since the products of this invention are conveniently utilized in diluted form for most purposes and since the diluents mentioned are in most cases colorless and of pleasant or slight odor. Similarly, complete removal of petroleum ether or other inert solvent from the product is usually unnecessary. However, I prefer to remove excess metal thiocyanate, selenocyanate, or tellurocyanate, and any other water soluble material from the product, for example, by thorough washing of a petroleum ether solution with water.

The compounds according to this invention are useful in insecticides. For example, they may be used in kerosene solution in a concentration between about 0.5% and about 20%, with or without other toxic agents such as pyrethrum and rotenone, as contact spray insecticides, or in emulsions, or on solid carriers. The compounds are also useful as flotation agents in the concentration of minerals. They may also be used as intermediates for the preparation of other compounds, such as, for example, wetting agents by treatment with an oxidation agent such as nitric acids. Many of the compounds possess wetting power without modification.

The term "aromatic" as used herein includes any radical containing a benzene linkage in its structure. The term "pinene" as used herein includes both the alpha and beta forms of pinene. Similarly, in referring to "terpineol" or the "terpinyl" radical, the alpha, beta, and gamma forms are included.

The application is a continuation-in-part of my previous application, Serial No. 198,687, filed March 29, 1938, entitled "Terpene-cyanoacyl compounds and methods of producing same" now Patent No. 2,217,611.

It will be understood that the details and examples hereinbefore set forth are illustrative only, and that the invention as broadly described and claimed is in no way limited thereby.

What I claim and desire to protect by Letters Patent is:

1. A terpene compound having the type formula ROOCR'XCN in which R is a radical consisting of an ether of a polyhydric alcohol and a terpene compound, in which R' is a radical selected from the group consisting of aliphatic radicals and aromatic radicals, and in which X is a member of the group consisting of sulfur, selenium, and tellurium.

2. A terpene compound having the type formula ROOCR'SCN in which R is a radical consisting of an ether of a polyhydric alcohol and a terpene compound, and in which R' is a radical selected from the group consisting of aliphatic radicals and aromatic radicals.

3. A terpene compound having the type formula ROOCR'TeCN in which R is a radical consisting of an ether of a polyhydric alcohol and a terpene compound, and in which R' is a radical selected from the group consisting of aliphatic radicals and aromatic radicals.

4. A terpene compound having the type formula ROOCR'SeCN in which R is a radical consisting of an ether of a polyhydric alcohol and a terpene compound, and in which R' is a radical selected from the group consisting of aliphatic radicals and aromatic radicals.

5. A terpene compound having the type formula ROOCR'SCN in which R is a radical consisting of an ether of a polyhydric alcohol and a terpene compound, and in which R' is an aliphatic radical.

6. A thiocyanoacetate of an ether of a terpene compound and a polyhydric alcohol.

7. A thiocyanopropionate of an ether of a terpene compound and a polyhydric alcohol.

8. A thiocyanoacylate of a terpinyl polyhydric alcohol ether.

9. A thiocyanoacetate of terpinyl ethylene glycol ether.

10. A thiocyanopropionate of terpinyl ethylene glycol ether.

11. A thiocyanoacetate of terpinyl glycerol ether.

12. A method for the production of the terpene compound described in claim 1, which consists of reacting an ether of a terpene compound and a polyhydric alcohol with a halogenated organic carboxylic acid and then with a compound selected from the group of metal thiocyanates, metal selenocyanates, and metal tellurocyanates, which is at least partially soluble in the reaction mixture.

13. A method for the production of the terpene compound described in claim 1, which consists of reacting an ether of a terpene compound and a polyhydric alcohol with a halogenated organic carboxylic acid and then with a metal thiocyanate which is at least partially soluble in the reaction mixture.

14. A method for the production of the terpene compound described in claim 1, which consists of reacting an ether of a terpene compound and a polyhydric alcohol with a halogenated lower fatty acid and then with an alkali metal thiocyanate.

15. A method for the production of the terpene compound described in claim 1, which consists of reacting an ether of a terpene compound and a polyhydric alcohol with a brominated aliphatic carboxylic acid and then with an alkali metal thiocyanate.

16. A method for the production of the terpene compound described in claim 1, which consists of reacting an ether of a terpene compound and a polyhydric alcohol with a chlorinated aliphatic organic carboxylic acid, and then with an alkali metal thiocyanate.

JOSEPH N. BORGLIN.